United States Patent [19]

Doré

[11] Patent Number: 4,742,161
[45] Date of Patent: May 3, 1988

[54] DISAZO AND TRISAZO COMPOUNDS CONTAINING ONE 6-HYDROXYPYRID-2-ONE COUPLING COMPONENT RADICAL PER AZO RADICAL

[75] Inventor: Jacky Doré, Basle, Switzerland
[73] Assignee: Sandoz Ltd., Basle, Switzerland
[21] Appl. No.: 735,831
[22] Filed: May 20, 1985

[30] Foreign Application Priority Data

May 19, 1984 [DE] Fed. Rep. of Germany ....... 3418739

[51] Int. Cl.$^4$ .................. C09B 35/18; C09B 35/20; C09B 35/35; C09B 44/02
[52] U.S. Cl. .................. 534/606; 162/162; 534/755; 534/757; 534/759
[58] Field of Search .............. 534/604, 605, 606, 607, 534/608, 755, 759

[56] References Cited

U.S. PATENT DOCUMENTS

| | | | |
|---|---|---|---|
| 4,087,244 | 5/1978 | Greve et al. | 8/41 |
| 4,167,509 | 9/1979 | Parton | 260/156 |
| 4,213,898 | 7/1980 | Entschel et al. | 534/606 X |
| 4,550,158 | 10/1985 | Doswald et al. | 534/605 |

FOREIGN PATENT DOCUMENTS

| | | | |
|---|---|---|---|
| 92520 | 10/1983 | European Pat. Off. | 534/608 |
| 1296857 | 11/1972 | United Kingdom | 534/608 |
| 2104090 | 3/1983 | United Kingdom | 534/606 |

*Primary Examiner*—Floyd D. Higel
*Attorney, Agent, or Firm*—Gerald D. Sharkin; Richard E. Vila; Melvyn M. Kassenoff

[57] ABSTRACT

Disazo and trisazo compounds of the formula

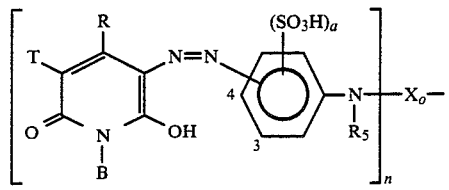

and salts thereof, wherein in
each B is independently hydrogen; $C_{1-4}$alkyl; ($C_{1-4}$alkoxy) $C_{1-4}$alkyl; $C_{2-4}$hydroxyalkyl; $C_{5-6}$cycloalkyl; $C_{5-6}$cyloalkyl substituted by 1 to 3 $C_{1-4}$alkyls; phenyl ($C_{1-3}$alkyl); phenyl ($C_{1-3}$alkyl) the phenyl group of which is substituted by 1 to 3 substituents selected from $C_{1-4}$alkyl, $C_{1-4}$alkoxy and halo;

$-A-NH-R_2$; $-A_2-N(R_7)_2$; $-A_N\ominus(R_8)_2$-$R_9A\oplus$ or $-N(R_7)_2$, wherein
A, $A_1$, $A_2$ and $R_7$-$R_9$ are as defined in the specification,
each R is independently hydrogen; amino $C_{1-4}$alkyl; $C_{5-6}$cycloalkyl; $C_{5-6}$cycloalkyl substituted by 1 or 2 $C_{1-4}$alkyls; phenyl; benzyl; phenylethyl; or phenyl, benzyl or phenylethyl the phenyl group of which is substituted by 1 or 2 substituents selected from methyl, ethyl, methoxy and ethoxy,
each $R_5$ is independently hydrogen or $C_{1-4}$alkyl,
each T is indendently hydrogen, cyano, halo, $-COOR_4$, $-CON(R_5)_2$, $-SO_2N(R_5)_2$, $-CH_2-NH-CO-CH_2-N(R_7)_2$, $-CH_2-NH-CO-CH_2-N\ominus(R_8)_2R_9A\oplus$,

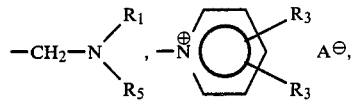

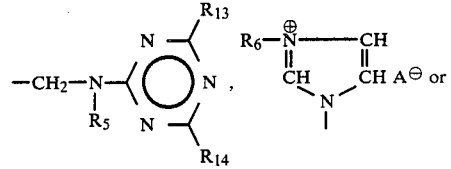

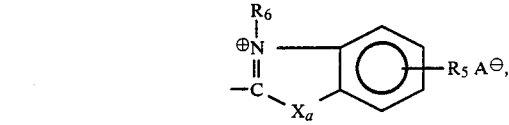

wherein
$R_1$, $R_3$-$R_9$, $R_{13}$, $R_{14}$ and $X_a$ are as defined in the specification,
$X_o$ is a divalent or trivalent bridging radical,
each a is independently 0 or 1, with the proviso that at least 2 a's are 1, and
n is d or 3, wherein each $A\oplus$ is independently a non-chromophoric anion, with the provisos that (i) the total number of basic and cationic groups is at least three and equals or exceeds the number of sulfo groups and (ii) each azo radical is in the 3- or 4-positions, are useful as dyes for dyeing and printing paper and textile materials 17 Claims, No Drawings

DISAZO AND TRISAZO COMPOUNDS CONTAINING ONE 6-HYDROXYPYRID-2-ONE COUPLING COMPONENT RADICAL PER AZO RADICAL

The invention relates to compounds suitable for use as dyestuffs and to intermediates for making such dyestuffs.

According to the invention there is provided disazo and trisazo compounds of formula I

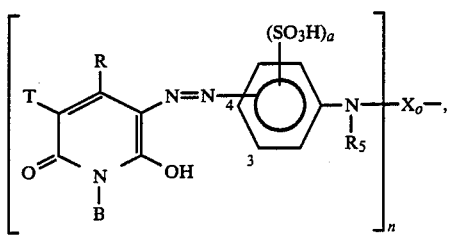

in free acid or in salt form;

in which R is hydrogen; —NH$_2$; C$_{1-4}$alkyl; C$_{5-6}$cycloalkyl unsubstituted or substituted by one or two C$_{1-4}$alkyl groups; phenyl, benzyl or phenylethyl, the phenyl group of the latter three substituents being unsubstituted or substituted by one or two groups selected from methyl, ethyl, methoxy and ethoxy;

n is 2 or 3;

a is 0 or 1, with the proviso that at least two a's are 1;

T is hydrogen, —CN,

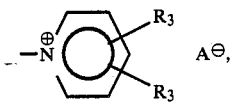

halogen, —COOR$_4$, —CON(R$_5$)$_2$, —SO$_2$N(R$_5$)$_2$, —CH$_2$NHCOCH$_2$N(R$_7$)$_2$, —CH$_2$NH-COCH$_2$N$^\oplus$(R$_8$)$_2$R$_9$A$^\ominus$,

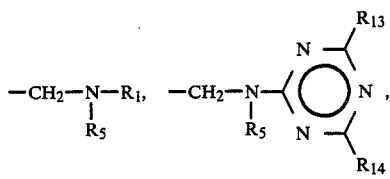

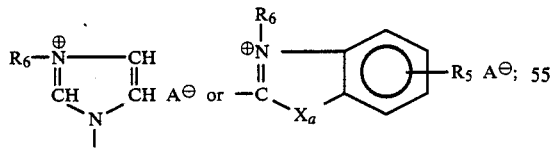

X$_o$ is a divalent or trivalent bridging radical; B is hydrogen; C$_{1-4}$alkyl unsubstituted or substituted by a C$_{1-4}$alkoxy; C$_{2-4}$alkyl substituted by hydroxy; C$_{5-6}$-cycloalkyl unsubstituted or substituted by one to three C$_{1-4}$alkyl groups; phenyl(C$_{1-3}$alkyl), the phenyl group of which is unsubstituted or substituted by one to three groups selected from C$_{1-4}$alkyl, C$_{1-4}$alkoxy and halogen; —A—NH—R$_2$; —A$_2$—N(R$_7$)$_2$; —A$_1$—N$^\oplus$(R$_8$)$_2$R$_9$A$^\ominus$ or —N(R$_7$)$_2$;

R$_1$ is (C$_{1-4}$alkyl)carbonyl, —CO—R$_c$—R$_d$,

—SO$_2$—C$_{1-4}$alkyl or —SO$_2$—R$_b$;

R$_a$ is hydrogen, methyl, halogen, methoxy, —CN or —CONH$_2$;

R$_b$ is phenyl, unsubstituted or substituted by 1 to 3 groups selected from C$_{1-4}$alkyl, C$_{1-4}$alkoxy and halogen or naphthyl, unsubstituted or substituted by 1 or 2 groups selected from C$_{1-4}$alkyl, C$_{1-4}$alkoxy and halogen;

R$_c$ is linear or branched C$_{1-4}$alkylene,

R$_d$ is halo, cyano or methoxy,

X$_a$ is —O—, —N(R$_5$)— or —S—;

R$_3$ is hydrogen, C$_{1-4}$alkyl, —N(R$_5$)$_2$ or —CON(R$_5$)$_2$;

R$_4$ is C$_{1-6}$alkyl or phenyl(C$_{1-3}$alkyl);

R$_5$ is hydrogen or C$_{1-4}$alkyl; or when two R$_5$'s are present attached to a nitrogen atom both R$_5$'s together with the N-atom to which they are attached can form a saturated ring which contains one to three hetero atoms;

R$_6$ is C$_{1-4}$alkyl;

A$_1$ is C$_{2-8}$alkylene, C$_{2-8}$alkylene interrupted by one —NR$_5$-radical and/or substituted by one —OH group or C$_{2-8}$alkenylene;

A$_2$ is C$_{1-8}$alkylene, C$_{2-8}$alkylene interrupted by one —NR$_5$-radical and/or substituted by one —OH group or C$_{2-8}$alkenylene;

A is C$_{1-10}$alkylene which may be interrupted by one or two hetero atoms; C$_{2-10}$alkenylene which may be interrupted by one or two hetero atoms; phenylene or cyclohexylene;

R$_2$ is

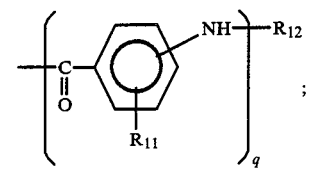

q is 0 or 1;

R$_{11}$ is hydrogen, halogen, —NO$_2$, C$_{1-4}$alkyl or C$_{1-4}$alkoxy;

R$_{12}$ is

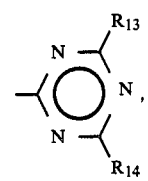

—CO(CH$_2$)$_p$—Z or hydrogen, with the proviso that R$_2$ is other than hydrogen when A has a significance of A$_2$;

p is an integer 1 to 3, R$_{14}$ is an aliphatic, cycloaliphatic, aromatic or heterocyclic amine group in which the N-atom is attached to the triazinyl ring;

R$_{13}$ is a significance of R$_{14}$, halogen, —OH, —NH$_2$, C$_{1-4}$-alkyl, C$_{1-4}$alkoxy or phenyl;

Z is —N(R$_7$)$_2$ or —N$^\oplus$(R$_8$)$_2$R$_9$A$^\ominus$;

each $R_7$, independently, is hydrogen, $C_{1-6}$alkyl, $C_{2-6}$-alkyl substituted by an halogen, —OH or —CN group, phenyl($C_{1-3}$alkyl), the phenyl ring of which is unsubstituted or substituted by 1 to 3 groups selected from halogen, $C_{1-4}$alkyl and $C_{1-4}$alkoxy; or $C_{5-6}$cycloalkyl, unsubstituted or substituted by 1 to 3 $C_{1-4}$alkyl groups;

or both $R_7$'s together with the N-atom to which they are attached form a 5- or 6-membered saturated ring which contains one to three hetero atoms;

each $R_8$, independently, has one of the non-cyclic significances of $R_7$ except hydrogen or both $R_8$'s together with N-atom to which they are attached have one of the cyclic significances of $R_7$, and $R_9$ is $C_{1-4}$alkyl unsubstituted or substituted by phenyl; or both $R_8$'s, $R_9$ and the N-atom to which they are attached form a pyridinium group (attached by its N-atom) unsubstituted or substituted by one or two $C_{1-4}$alkyl groups; or a group $\beta$

where $Z_0$ is —O—, a direct bond, —NH—, —NR$_6$—,

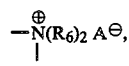

—SO$_2$—, —SO—, —S— or —CH$_2$—; and
$A^\ominus$ is a non-chromophoric anion;
with the provisos that:
(i) in the compound of formula I the total number of basic plus cationic groups is three or more and equals or exceeds the total number of sulfo groups; and
(ii) in the compounds of formula I the azo group is located in the 3- or 4-position (shown) of the phenyl group.

Preferably, in $A_1$ and $A_2$ any —NR$_5$-radical or hydroxy group is separated from the nitrogen atom of the pyridone ring and the nitrogen atom of the —N(R$_7$)$_2$ or —N$^\oplus$(R$_8$)$_2$R$_9$ group by at least two carbon atoms and preferably the latter two groups are separated from the nitrogen atom of the pyridone ring by at least two carbon atoms.

In the specification halogen means fluorine, chlorine, bromine or iodine, preferably chlorine.

The term "basic group" includes protonatable primary, secondary and tertiary amino groups and quaternary ammonium groups.

Where any symbol appears more than once in a formula, unless indicated to the contrary its significances are independent of one another whether or not the word "independently" is indicated.

Any alkyl, alkylene or alkenylene present (capable of being linear or branched) is linear or branched unless indicated otherwise. The alkyl group of any alkoxy group is linear or branched unless indicated to the contrary.

Any aliphatic amine group is preferably a mono-$C_{1-4}$alkyl- or a di-($C_{1-4}$alkyl)-amino or hydrazine group. The alkyl group may be substituted by 1 to 3 groups selected from halogen, phenyl, hydroxy and $C_{5-6}$cycloalkyl.

Any cycloaliphatic amine group present is preferably $C_{5-6}$cycloalkylamine, the cycloalkyl group of which may be substituted by one or two $C_{1-2}$alkyl groups.

Any aromatic amine group present is preferably anilins, the phenyl ring of which is unsubstituted or substituted by one to three substituents selected from $C_{1-4}$alkyl, $C_{1-4}$alkoxy, halogen, hydroxy and phenoxy.

Any heterocyclic amine present is preferably pyridine, triazine, pyridazine, pyrimidine or pyrazine (when unsaturated) and morpholine, pyrrolidine, piperidine, piperazine or N-methylpiperazine (when saturated). Each group may be substituted by one to three $R_6$ groups.

When any scope or variable contains a variable, the preferred significances of the latter variable apply to the scope or variable in question. Thus, for example, the preferred compounds of Formula Ia include those wherein the $R_{13}$ of the $X'_o$, if any, is preferably $R'_{13}$, more preferably $R'_{13a}$ and most preferably $R''_{13}$, the preferred compounds of Formula Ib are those wherein the $R'_{13}$ of the $X''_o$, if any, is preferably $R'_{13a}$ and more preferably $R''_{13}$, and any $R_{13}$ in $R_2$ is preferably $R'_{13}$, more preferably $R'_{13a}$ and most preferably $R''_{13}$.

$R_1$ is preferably $R'_1$, where $R'_1$, is —CO—R$_c$—R'$_d$, wherein R$_c$ is $C_{1-4}$alkylene, and R$_d$ is —CN, —OCH$_3$ or chloro; most preferably $R_1$ is —COCH$_2$Cl.

R is preferably R', where R', is methyl, ethyl, unsubstituted phenyl, unsubstituted benzyl or unsubstituted cyclohexyl. More preferably R is R'', where R'' is methyl or unsubstituted phenyl.

T is preferably T', where T' is hydrogen, —CN,

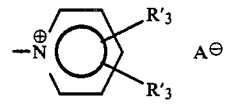

or —CON(R'$_5$)$_2$, where R'$_3$ and R'$_5$ are defined below. More preferably T is T'', where T'' is hydrogen, —CN or

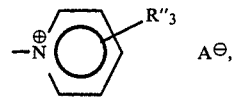

where R''$_3$ is defined below.

B is preferably B', where B' is —A'—NH—R'$_2$, hydrogen, —CH$_3$, —C$_2$H$_5$, —C$_2$H$_4$OH, unsubstituted cyclohexyl, benzyl, —(CH$_2$)$_{1-3}$N(R'$_7$)$_2$ or —(CH$_2$)$_{2-3}$N$^\oplus$(R'$_8$)$_2$R'$_9$A$^\ominus$, where the symbols are defined below. B is more preferably B'', where B'' is —A''—NH—R''$_2$, hydrogen, —CH$_3$, —C$_2$H$_5$, benzyl, —(CH$_2$)$_{2-3}$N(R''$_7$)$_2$ or —(CH$_2$)$_{2-3}$N$^\oplus$(R''$_8$)$_2$R''$_9$A$^\ominus$; most preferably B is B''', where B''' is hydrogen, —(CH$_2$)$_{2-3}$N(R''$_7$)$_2$ or —(CH$_2$)$_{2-3}$N$^\oplus$(R''$_8$)$_2$R''$_9$A$^\ominus$.

Preferably A is A', where A' is $C_{2-8}$alkylene or unsubstituted phenylene. More preferably A is A'', where A'' is 1,2-ethylene, 1,3-propylene or unsubstituted meta or para phenylene.

Preferably $R_2$ is $R'_2$, where $R'_2$ is a group of the formula

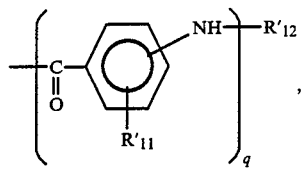

where the symbols $R'_{11}$ and $R'_{12}$ are defined below. More preferably $R_2$ is $R''_2$, where $R''_2$ is

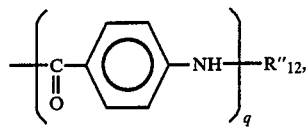

where $R''_{12}$ is defined below.

Preferably $R_3$ is $R'_3$, where $R'_3$ is hydrogen, methyl, ethyl, —$NH_2$, —$N(CH_3)_2$, —$CON(CH_3)_2$ or —$ON(C_2H_5)_2$. More preferably $R_3$ is $R''_3$, s hydrogen or methyl.

Preferably $R_5$ is $R'_5$, where $R'_5$ is hydrogen, methyl or ethyl, most preferably $R_5$ is $R''_5$, where $R''_5$ is hydrogen or methyl.

Preferably $R_6$ is $R'_6$, where $R'_6$ is methyl or ethyl.

Preferably $R_7$ is $R'_7$, where $R'_7$ is hydrogen, linear or branched $C_{1-6}$alkyl, unbranched $C_{2-3}$hydroxyalkyl, benzyl, 2-cyanoethyl or both $R_7$'s together with the N-atom to which they are attached form a pyrrolidine, piperidine, morpholine, piperazine or N-methylpiperazine group, which five groups are unsubstituted.

More preferably $R_7$ is $R''_7$, where $R''_7$ is hydrogen, methyl, ethyl or 2hydroxyethyl or both $R''_7$'s together with the N-atom to which they are attached form a morpholine, piperidine, piperazine or N-methylpiperazine group, which four groups are unsubstituted.

Preferably $R_8$ is $R'_8$, where $R'_8$ is one of the non-cyclic significances of $R'_7$ except hydrogen or both $R'_8$'s together with the N-atom to which they are attached form one of the cyclic significances of $R'_7$, and $R_9$ is $R'_9$, where $R'_9$ is methyl, ethyl, propyl or benzyl or both $R'_8$'s and $R'_9$ together with the N-atom to which they are attached form a pyridinium ring, unsubstituted or substituted by one or two methyl groups or a group $\beta$

where $Z_o$ is —O—, a direct bond, —$CH_2$—, —NH—, —$NR_6$—,

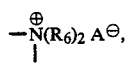

—$SO_2$—, —SO— or —S—. More preferably $R_8$ is $R''_8$, where $R''_8$ is one of the non-cyclic significances of $R''_7$ except hydrogen, or both $R''_8$'s together with the N-atom to which they are attached form one of the cyclic significances of $R''_7$, and $R_9$ is $R''_9$, where $R''_9$ is —$CH_3$, —$C_2H_5$ or benzyl or both $R''_8$'s and $R''_9$ together with the N-atom to which they are attached form a pyridinium ring, unsubstituted or substituted by one or two methyl groups, or is a group $\beta$ defined above, wherein $R'_9$ is $R''_9$ and, preferably, $R_6$ is $R'_6$.

Preferably $R_{11}$ is $R'_{11}$, where $R'_{11}$ is hydrogen, chloro, nitro, methyl or methoxy.

Preferably $R_{12}$ is $R'_{12}$, where $R'_{12}$ is

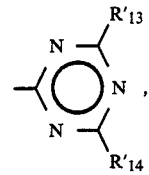

—$CO(CH_2)_{1-2}$—$Z'$ or hydrogen,

More preferably $R_{12}$ is $R''_{12}$, where $R'_{12}$ is hydrogen, —$COCH_2Z''$ or

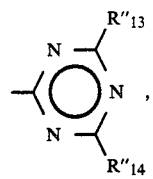

where $R''_{13}$, $R''_{14}$ and $Z''$ are defined below.

Preferably $R_{13}$ is $R'_{13}$, where $R'_{13}$ is chloro, —OH, —$NH_2$, —$OCH_3$,

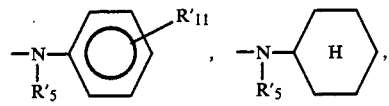

bis-($C_{2-4}$hydroxyalkyl)amino or

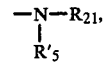

where $R_{21}$ is $C_{1-12}$alkyl, unsubstituted or substituted by —OH and uninterrupted or interrupted by one to three groups selected from —$N(R_7)$— and

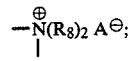

—$NHCOCH_2$—Z, —$CH_2CONH$—$Y_1$—Z, —$Y_1$—Z,

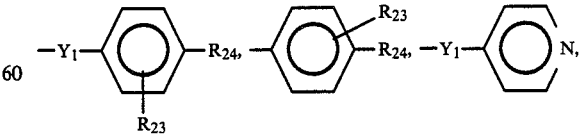

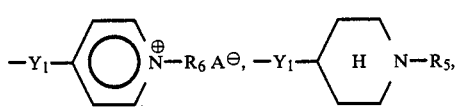

-continued

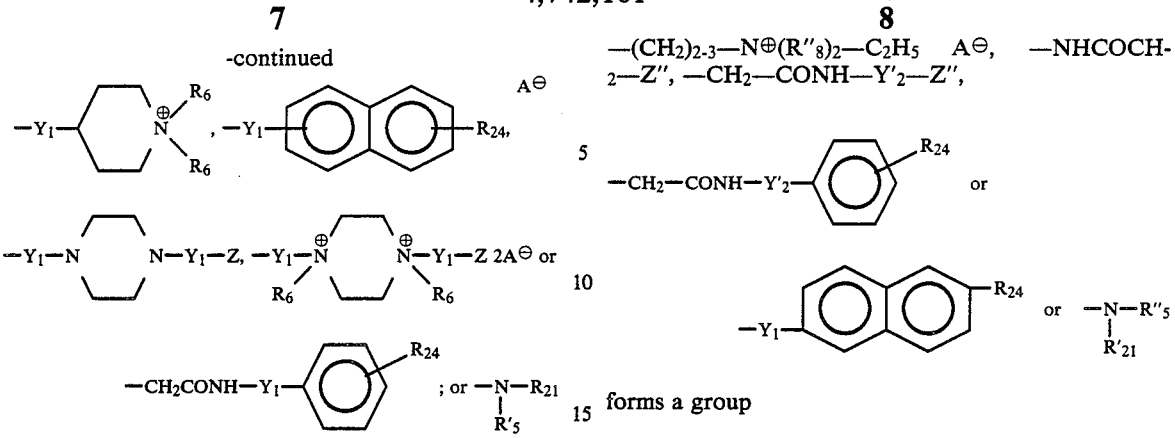

forms a group

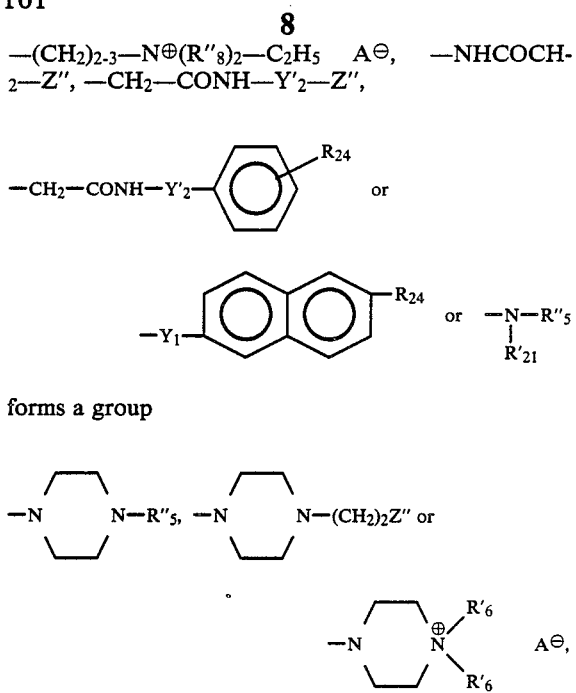

where $Y_1$ is a $C_{1-8}$alkylene or a $C_{3-8}$alkenylene group, Z is —N($R_7$)$_2$ or —N$^\oplus$($R_8$)$_2R_9$A$^\ominus$, $R_{23}$ is halogen, —OH, —NO$_2$, $C_{1-4}$alkyl or $C_{1-4}$alkoxy; and $R_{24}$ is —N(R'$_7$)$_2$, —N$^\oplus$(R'$_8$)$_2$R'$_9$A$^\ominus$, —CO—Y$_2$—Z', —NHCO—Y$_2$—Z', —CONH—Y$_2$—Z', —SO$_2$NH—Y$_2$—Z', —Y$_2$—Z' or —NHNHCOCH$_2$—Z', where $Y_2$ is $C_{1-8}$alkylene.

R'$_{13}$ is preferably R'$_{13a}$, where R'$_{13a}$ are the significances of R'$_{13}$ wherein the hydroxy group of any hydroxyalkyl group attached to a nitrogen atom is in other than the 1-position; no atom contains more than one t-alkyl or substituted t-alkyl substituent; any R$_{21}$ that is $C_{1-12}$alkyl, unsubstituted or substituted by one hydroxy group and uninterrupted or interrupted by one to three groups selected from —NR$_7$— and —N$^\oplus$(R$_8$)$_2$—A$^\ominus$ is $C_{1-12}$alkyl, $C_{2-12}$alkyl monosubstituted by hydroxy in other than the 1-position, —(CH$_2$)$_m$—NR'$_7$—(CH$_2$)$_m$—NR'$_7$R'$_{7a}$, —(CH$_2$)$_m$—NR'$_7$—(CH$_2$)$_m$—N$^\oplus$(R'$_8$)$_2$R'$_{9a}$A$^\ominus$, —(CH$_2$)$_m$—N$^\oplus$(R'$_8$)$_2$—(CH$_2$)$_m$—NR'$_7$R'$_{7a}$A$^\ominus$ or —(CH$_2$)$_m$—N$^\oplus$(R'$_8$)$_2$—(CH$_2$)$_m$—N$^\oplus$(R'$_8$)$_2$R'$_{9a}$2A$^\ominus$, wherein R'$_{7a}$ is primary or secondary $C_{1-4}$alkyl, 2-hydroxyethyl or 2- or 3-hydroxypropyl, R'$_{9a}$ is methyl, ethyl or propyl, and m is 2, 3 or 4;

each $R_5$ is R'$_5$; each $R_6$ is R'$_6$, any $Y_1$ or $Y_2$ linking two nitrogen atoms is $C_{2-8}$alkylene, the two nitrogen atoms being separated by at least two carbon atoms, and each Z is Z'.

More preferably R$_{13}$ is R''$_{13}$, where R''$_{13}$ is

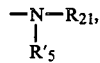

where R'$_{21}$ is —(CH$_2$)$_{2-3}$—N(R''$_7$)—(CH$_2$)$_{2-3}$—N(R''$_7$)C$_2$H$_5$, —(CH$_2$)$_{2-3}$—N$^\oplus$(R''$_8$)$_2$—(CH$_2$)$_{2-3}$—N$^\oplus$(R''$_8$)$_2$C$_2$H$_5$2A$^\ominus$, —(CH$_2$)$_{2-3}$—N(R''$_7$)—C$_2$H$_5$, —(CH$_2$)$_{2-3}$—N$^\oplus$(R''$_8$)$_2$—C$_2$H$_5$ A$^\ominus$, —NHCOCH$_2$—Z'', —CH$_2$—CONH—Y'$_2$—Z'',

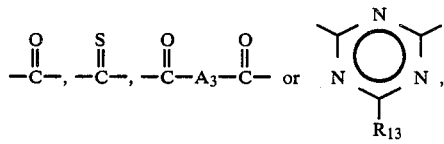

forms a group

where Y'$_2$ is $C_{1-4}$alkylene. Any Y'$_2$ linking two nitrogen atoms is preferably $C_{2-4}$alkylene, the two nitrogen atoms being separated by at least two carbon atoms.

Preferably Z is Z', where Z' is —N(R'$_7$)$_2$ or —N$^\oplus$(R'$_8$)$_2$R'$_9$A$^\oplus$.

More preferably Z is Z'', where Z'' is —N(R''$_7$)$_2$ or —N$^\oplus$(R''$_8$)$_2$R''$_9$A$^\ominus$.

Preferably R$_{14}$ is R'$_{14}$, where R'$_{14}$ is $$-\underset{R'_5}{\underset{|}{N}}-R_{21},$$

where R'$_5$ and R$_{21}$ are defined above. More preferably R$_{14}$ is R''$_{14}$, where R''$_{14}$ is —NR''$_5$R'$_{21}$. Preferably, R'$_{14}$ has one of the —NR'$_5$R$_{21}$ significances of R'$_{13a}$.

X$_o$ is preferably X'$_o$, where X'$_o$, when n=2, is

and, when n=3, X'$_o$ is

A$_3$ is $C_{1-4}$alkylene, —CH=CH—,

a direct bond,

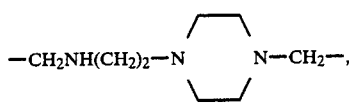

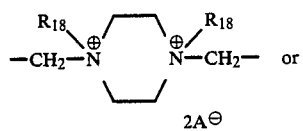

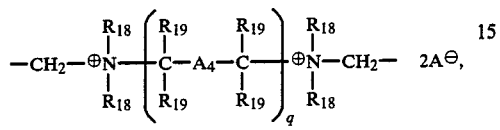

where $R_{18}$ is $C_{1-6}$alkyl, unsubstituted or monosubstituted by phenyl; $C_{2-4}$alkyl monosubstituted by —OH, —CN or halogen; or $C_{2-6}$alkenyl, unsubstituted or monosubstituted by —OH, —CN, halogen or phenyl;

$R_{19}$ is hydrogen or a significance of $R_{18}$;

q is 0 or 1;

$A_4$ has a significance of A' defined above, is a direct bond or is

where s is 0, 1, 2, 3, 4, 5 or 6;

$A_5$ is —NHCONH—, —NHCO—(CH$_2$)$_s$—CONH—,

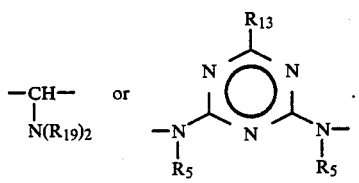

$R_{18}$ is preferably $R'_{18}$, where $R'_{18}$ is $C_{1-4}$alkyl unsubstituted or monosubstituted by phenyl or $C_{2-4}$alkyl monosubstituted by —OH, —CN or halogen; $R_{18}$ is more preferably —CH$_3$.

$R_{19}$ is preferably $R'_{19}$, where $R'_{19}$ is hydrogen, unsubstituted $C_{1-4}$alkyl or $C_{2-4}$alkyl monosubstituted by —OH, —CN or halogen. $R_{19}$ is more preferably hydrogen.

$A_4$ is preferably $A'_4$, where $A'_4$ has a significance of A", is a direct bond or

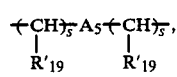

wherein preferably any $R_5$ is $R'_5$ any $R_{13}$ is $R'_{13a}$, especially $R''_{13}$, and any $R_{19}$ is $R'_{19}$, especially hydrogen.

More preferably $X_o$ is $X''_o$, where $X''_o$, when n=2, is

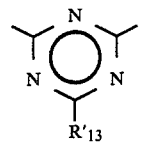

and, when n=3, is

$R'_{13}$ is preferably $R'_{13a}$, and more preferably $R''_{13}$.

Preferably n is 2.

Preferred compounds of formula I are those of formula Ia

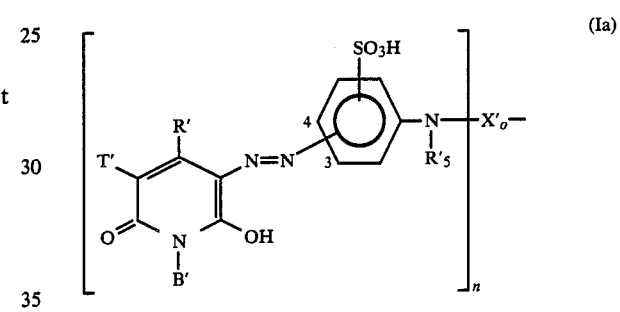

(Ia)

where the symbols are as defined above.

More preferred compounds of formula I are those of formula Ib

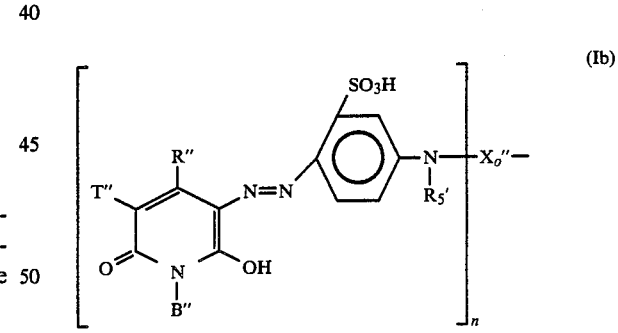

(Ib)

where the symbols are defined above.

Compounds of formula I can be prepared by known methods from known compounds, for example by reacting 1 mole of a diazotised compound of formula II (in free acid or salt form)

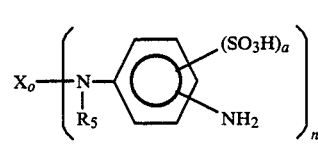

(II)

with n moles of a compound of formula III

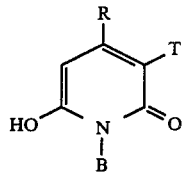 (III)

Asymmetric compounds of formula I can be formed by using different compounds of formula III.

Compounds of formulae II and III are known or can be prepared by known methods from known compounds.

The term "salt form" includes acid addition salts (wherein, for example, one or more basic non-cationic groups are in the form of acid addition salts with, for example, a non-chromophoric acid HA, HA being an acid corresponding to $A^{\ominus}$, as defined and exemplified herein), salts wherein one or more acidic (e.g., sulpho) groups are in salt form (with, for example, a non-chromophoric cation such as lithium, sodium, potassium or ammonium) and internal salts (wherein, for example, the negative charge of at least one sulpho group is balanced by a cationic group of the molecule (as in Examples 1 and 32–44, for example). See also column 2, lines 2–4 and 6–8, column 4, lines 23–29 and column 31, lines 18–27 of U.S. Pat. No. 4,273,707 which are hereby incorporated by reference.

In the compounds of formula I the anions $A^{\ominus}$ can be any non-chromophoric anions such as those conventional in basic dyestuff chemistry. Suitable anions include chloride, bromide, sulphate, bisulphate, methylsulphate, aminosulphonate, perchlorate, benzenesulphonate, oxalate, maleate, acetate, propionate, lactate, succinate, tartrate, malate, methanesulphonate and benzoate as well as complex anions, for example zinc chloride double salts and anions of boric acid, citric acid, glycollic acid, diglycollic acid and adipic acid or addition products of ortho boric acids with polyalcohols with at least one cis diol group present. These anions can be exchanged for each other with ion exchange resins or reaction with acids or salts (for example via the hydroxide or bicarbonate) or according to German Offenlegunsschrift Nos. 2,001,748 or 2,001,816.

The compounds of formula I in water-soluble acid addition salt form or in quaternary ammonium salt form (hereinafter referred to as the dyes of formula I) are useful as dyestuffs for dyeing and printing fibres, threads or textile materials, particularly cellulose materials, for example cotton, which preferably can be dyed by exhaustion, using a long or short dyebath at room to boiling temperatures.

Printing can be carried out by impregnation with a printing paste which can be prepared by known methods.

In particular the dyes of formula I are suitable for dyeing or printing paper, for example in the production of sized or unsized, wood-free or wood-containing paper. The dyes of formula I may be used for dyeing paper by the dipping process. Dyeing of paper is effected by known methods.

The dyes of formula I can be used for dyeing or printing leather, particular low affinity leather, that can be tanned using vegetable derived tanning agents according to known methods.

The dyes of formula I may also be applied to bast fibres such as hemp, flax, sisal, jute, coir or straw.

The resulting dyeings on paper, leather and bast fibres, especially on paper, show good use properties.

The dyes of formula I may be formulated into solid or liquid preparations. Processing into stable liquid or solid dyeing preparations may take place in a generally known manner, advantageously by grinding or granulating (for solid preparations) or by dissolving in suitable solvents optionally adding an assistant, e.g. a stabiliser or dissolving intermediary such as urea (for liquid preparations). Such preparations may be obtained for example as described in French Patent Specification Nos. 1,572,030 and 1,581,900 or in accordance with DOS Nos. 2,001,748 and 2,001,816.

Liquid dyeing compositions are preferably as follows:
1 Part by weight of a dye of formula I
0.01–1 Part by weight of an inorganic salt (preferably 0.01 to 0.1 part)
0.01–1 Part by weight of an organic acid such as formic, acetic, lactic or citric acid
0.01–8 Parts by weight of water; and
0–5 Parts by weight of a solubilising agent such as glycols (diethylene glycol, triethylene glycol or hexylene glycol), glycol ethers such as methyl cellosolve, methylcarbitol, butylpolyglycol, urea, formate and dimethylformamide.

Solid dye compositions are preferably as follows:
1 Part by weight of a dye of formula I
0.01–1 Part by weight of an inorganic salt (preferably 0.01 to 0.1 part)
0–8 Parts by weight of a preparation agent such as urea, dextrin, glucose or d-glucose).

The solid compositions may usually contain up to 20% water.

The dyes of formula I have good solubility properties, in particular good cold water solubility. The dyes of formula I have a high substantivity and the waste water from the preparation of sized and unsized paper contains practically no colour or is colored only to a small extent.

The dyes of formula I blend well and are not pH sensitive (in the range 4 to 9) or sensitive to filler material. Dyeings on paper of the dyes of formula I are brilliant and show good light fastness properties. The dyes also change tone in tone when subjected to long light exposure. The paper dyeings also have good wet fastness properties not only to water but also to milk, soap, water, sodium chloride solution, fruit juice and sweetened mineral water. Further, the dyeings are also fast to alcoholic beverages and are fast to bleach.

The dyes of formula I have a high substantivity, that is to say they exhaust almost quantitatively and show good build-up properties. They can be added directly in the mass without previously having been made into a solution, e.g., as a dry powder or granulate, without loss of brilliance or lessening of the dyestuff yield. Sized paper compared to unsized paper shows no large loss of dye. The dyes of formula I can also be used in soft water with full dyestuff yield.

Fibre material such as wood pulp can be dyed with the dyes of formula I to give good and level dyeings. Further, the dyes of formula I can be used in the preparation of coated paper. Since the dyes of the invention are not pigments they can be used with filling material such as Kaolin and can be applied in a single surface coating to paper. The dyed paper is oxidatively as well as reductively bleachable which is an advantage for the recycling of old paper or excess paper.

EXAMPLE 1

5.8 Parts of 2,4-bis-(4'-amino-3'-sulphophenylamino)-6-(diethylaminopropylamino)-5-triazine are dissolved in 150 parts of water and 6 parts of a 30% hydrochloric acid solution. Diazotisation takes place by the dropwise addition of a 25% sodium nitrite solution at 0° to 5°. To the resulting yellow-brown tetra-azo solution, 7.4 parts of a 35% aqueous solution of 3-cyano-6-hydroxy-4-methyl-1-(3'-trimethylammonium)propylpyrid-2-one methylsulphate are added. By the addition of sodium acetate the pH is slowly raised to 5 and the temperature is at the same time allowed to rise to 20° to 25°. A red dye suspension forms. Once the coupling reaction is completely finished the resulting dyestuff is filtered and the filtered material is washed with a little water.

A dyestuff of formula 1a results

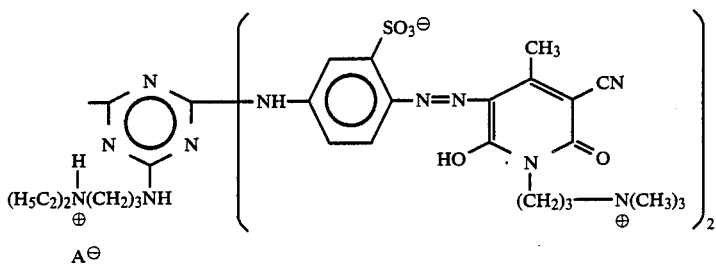

where $A^{\ominus}$ is the anion of the medium, preferably acetate.

The resulting dyestuff dissolves well in water, particularly in the presence of a carboxylic acid for example acetic acid, lactic acid, formic acid, methoxyacetic acid, ethoxyacetic acid or glycollic acid. The dyestuff dyes paper a red colour and the resulting dyeings have good fastness properties (to water, alcohol, milk, urine, sodium chloride solution, soaping and sulphuric acid) as well as having a very good light fastness. Changing the pH in the range of 4 to 9 of the dyeings does not affect the dyeings appreciably and the resulting waste water of the dyeings is practically colourless.

EXAMPLES 2 TO 27

Compounds of the formula

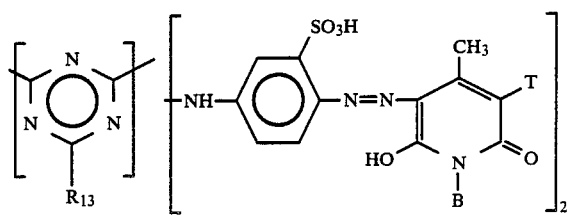

in which the symbols are defined in Table 1 below can be prepared by a method analogous to that of Example 1 from appropriate starting compounds.

TABLE 1

| EX. No. | $R_{13}$ | T | B | shade on paper |
|---|---|---|---|---|
| 2 | —NH(CH$_2$)$_3$N(C$_2$H$_5$)$_2$ | —$^{\oplus}$N⟨C$_6$H$_5$⟩ A$^{\ominus}$ | —(CH$_2$)$_3$N(CH$_3$)$_2$ | yellowish-red |
| 3 | —NH(CH$_2$)$_3$N(C$_2$H$_5$)$_2$ | H | —(CH$_2$)$_3$N(CH$_3$)$_2$ | orange |
| 4 | —NH(CH$_2$)$_3$N(C$_2$H$_5$)$_2$ | CN | —(CH$_2$)$_3$N(CH$_3$)$_2$ | red |
| 5 | —NH(CH$_2$)$_3$N(C$_2$H$_5$)$_2$ | —$^{\oplus}$N⟨C$_6$H$_5$⟩ A$^{\ominus}$ | —CH$_2$CHNH$_2$ \| CH$_3$ | yellowish-red |
| 6 | —NH(CH$_2$)$_3$N(C$_2$H$_5$)$_2$ | —$^{\oplus}$N⟨C$_6$H$_4$-CH$_3$⟩ A$^{\ominus}$ | —CH$_2$CHNH$_2$ \| CH$_3$ | yellowish red |
| 7 | —NH(CH$_2$)$_3$N(C$_2$H$_5$)$_2$ | —$^{\oplus}$N⟨C$_6$H$_4$-CH$_3$⟩ A$^{\ominus}$ | —(CH$_2$)$_3$N(CH$_3$)$_2$ | yellowish red |

TABLE 1-continued

| EX. No. | R₁₃ | T | B | shade on paper |
|---|---|---|---|---|
| 8 | —NH(CH₂)₃N(C₂H₅)₂ | —⁺N-pyridinyl(3-CH₃) A⁻ | —CH₂CH₂NH₂ | yellowish red |
| 9 | Cl | —⁺N-pyridinyl(3-CH₃) A⁻ | —(CH₂)₃N(CH₃)₂ | orange |
| 10 | —NHCH₂CH₂OH | —⁺N-pyridinyl A⁻ | —(CH₂)₃N(CH₃)₂ | yellowish red |
| 11 | —NH—C₆H₅ | —⁺N-pyridinyl A⁻ | —(CH₂)₃N(CH₃)₂ | yellowish red |
| 12 | —NHCH₂CHNH₂ \| CH₃ | —⁺N-pyridinyl A⁻ | —(CH₂)₃N(CH₃)₂ | yellowish red |
| 13 | —NHCH₂CHNH₂ \| CH₃ | —⁺N-pyridinyl(3-CH₃) A⁻ | —(CH₂)₃N(CH₃)₂ | yellowish red |
| 14 | —NHCH₂CHNH₂ \| CH₃ | —⁺N-pyridinyl(3-CH₃) A⁻ | —CH₃ | yellowish red |
| 15 | —NHCH₂CHNH₂ \| CH₃ | —⁺N-pyridinyl(3-CH₃) A⁻ | —(CH₂)₃—CH₃ | yellowish red |
| 16 | —NHCH₂CHNH₂ \| CH₃ | —⁺N-pyridinyl(3-CH₃) A⁻ | —(CH₂)₃OCH₃ | yellowish red |
| 17 | —NHCH₂CHNH₂ \| CH₃ | —⁺N-pyridinyl(3-CH₃) A⁻ | —CH₂CH₂OH | yellowish red |

TABLE 1-continued

| EX. No. | R₁₃ | T | B | shade on paper |
|---|---|---|---|---|
| 18 | $-NHCH_2CHNH_2$ \| $CH_3$ | $-\overset{\oplus}{N}$⟨pyridine⟩$-CH_3$  $A^{\ominus}$ | ⟨phenyl⟩$-NH-$⟨triazine with $NHC_2H_4OH$ and $NH(CH_2)_3N(C_2H_5)_2$⟩ | bluish-red |
| 19 | $-NHCH_2CHNH_2$ \| $CH_3$ | $-\overset{\oplus}{N}$⟨pyridine⟩$-CH_3$  $A^{\ominus}$ | $-CH_2CHNH_2$ \| $CH_3$ | yellowish-red |
| 20 | $-NH(CH_2)_3N(C_2H_5)_2$ | $-\overset{\oplus}{N}$⟨pyridine⟩ $A^{\ominus}$ | $-(CH_2)_2N(C_2H_5)_2$ | scarlet |
| 21 | $-NH(CH_2)_3N(C_2H_5)_2$ | $-\overset{\oplus}{N}$⟨pyridine⟩ $A^{\ominus}$ | $-(CH_2)_3NHCH(CH_3)_2$ | scarlet |
| 22 | $-NH(CH_2)_3N(C_2H_5)_2$ | $-\overset{\oplus}{N}$⟨pyridine⟩ $A^{\ominus}$ | $-(CH_2)_3-N$⟨morpholine⟩$O$ | scarlet |
| 23 | $-NH(CH_2)_3N(C_2H_5)_2$ | $-\overset{\oplus}{N}$⟨pyridine⟩ $A^{\ominus}$ | $-(CH_2)_3NHCH_3$ | orange |
| 24 | $-NH(CH_2)_3N(C_2H_5)_2$ | $-\overset{\oplus}{N}$⟨pyridine⟩ $A^{\ominus}$ | H | orange |
| 25 | $-N$⟨piperazine⟩$N-CH_2CH_2NH_2$ | $-\overset{\oplus}{N}$⟨pyridine⟩ $A^{\ominus}$ | $-(CH_2)_3N(CH_3)_2$ | scarlet |
| 26 | $-NH(CH_2)_3NHCH_3$ | $-\overset{\oplus}{N}$⟨pyridine⟩ $A^{\ominus}$ | $-(CH_2)_3-N(CH_3)_2$ | scarlet |
| 27 | $-NH(CH_2)_3N(C_2H_5)_2$ | $-\overset{\oplus}{N}$⟨pyridine⟩ $A^{\ominus}$ | $-(CH_2)_3-\overset{\oplus}{N}(CH_3)_3 A^{\ominus}$ | scarlet |

EXAMPLES 28 TO 31

Compounds of the formula

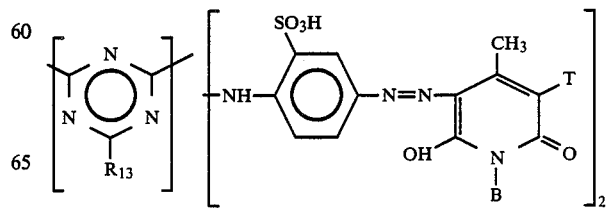

in which the symbols are defined in Table 2 below can be prepared by a method similar to that of Example 1 from appropriate compounds.

in which the symbols are defined in Table 3 below can be formed by a method analogous to that of Example 1 from appropriate starting compounds.

TABLE 2

| EX. No. | $R_{13}$ | T | B | Shade on paper |
|---|---|---|---|---|
| 28 | $-NH(CH_2)_3N(C_2H_5)_2$ |  | $-(CH_2)_3-N(CH_3)_2$ | scarlet |
| 29 | $-NH(CH_2)_3N(C_2H_5)_2$ | $-CN$ | $-(CH_2)_3-N(CH_3)_2$ | bluish-red |
| 30 | $-NHCH_2CHNH_2$ with $CH_3$ | 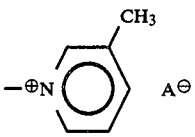 | $-(CH_2)_3-N(CH_3)_2$ | scarlet |
| 31 | $-NHCH_2CH_2OH$ | 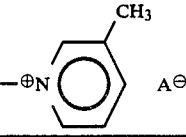 | $-(CH_2)_2N(C_2H_5)_2$ | scarlet |

EXAMPLES 32 TO 36

Compounds of the formula

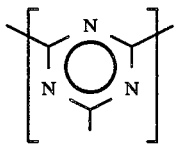

TABLE 3

| EX. No. | $R_3$ | B | Shade on paper |
|---|---|---|---|
| 32 | H | $-(CH_2)_3-N(CH_3)_2$ | orange-scarlet |
| 33 | $-CH_3$ | " | " |
| 34 | H | $-(CH_2)_2N(C_2H_5)_2$ | " |
| 35 | H | $-CH_2CH_2NH_2$ | " |
| 36 | $-CH_3$ | " | " |

EXAMPLES 37 TO 43

Compounds of the formula

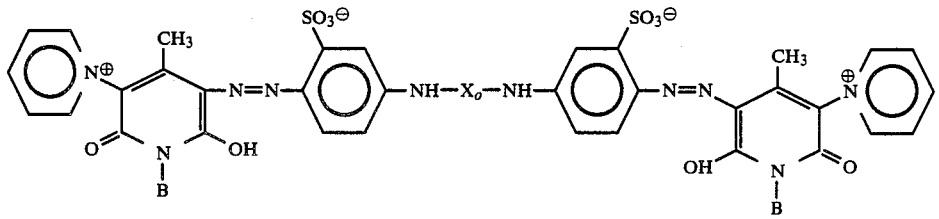

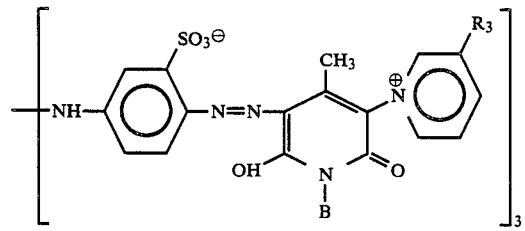

in which the symbols are defined in Table 4 below can be formed by a method similar to that of Example 1 from appropriate starting compounds.

TABLE 4

| Ex. No. | $X_o$ | B | Shade on paper |
|---|---|---|---|
| 37 | $-CO-$ | $-(CH_2)_3N(CH_3)_2$ | orange |
| 38 | $-CO-$ | $-CH_2CH_2NH_2$ | orange |
| 39 | $-CO-$ | 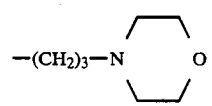 | orange |

TABLE 4-continued

| Ex. No. | $X_o$ | B | Shade on paper |
|---|---|---|---|
| 40 | —CO—CH=CH—CO— | —(CH$_2$)$_3$N(CH$_3$)$_2$ | orange |
| 41 | —CO—(CH$_2$)$_2$CO— | —(CH$_2$)$_3$N(CH$_3$)$_2$ | orange |
| 42 | 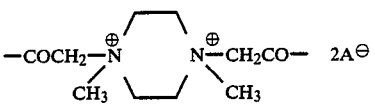 | —(CH$_2$)$_3$N(CH$_3$)$_2$ | orange |
| 43 | 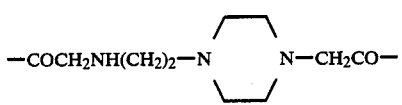 | —(CH$_2$)$_3$N(CH$_3$)$_2$ | orange |

EXAMPLE 44

5.8 Parts of 2,4-bis-(4'-amino-3'-sulphophenylamino)-6-(3'-diethylaminopropylamino)-1,3,5-triazine are dissolved in 150 parts of water and 6 parts of 30% hydrochloric acid. Diazotisation is carried out by the dropwise addition of a 25% sodium nitrite solution at 0°–5°. To the yellowish-brown tetraazo solution 2.87 parts of 6-hydroxy-4-methyl-1-(3'-dimethylaminopropyl)-pyridonyl-(3)-pyridinium betaine are added. The pH is 1.5 to 2.0 at 0° to 5°. After 1 hour of further stirring coupling is completed. 3.6 parts of a 35% aqueous solution of 3-cyano-6-hydroxy-4-methyl-1-(3'-trimethylammonium-propyl)pyrid-2-one methylsulphate are then added. The pH is raised to 2.5 to 3.0 with the addition of sodium acetate and the temperature is allowed to rise to 20° to 25°. A red dyestuff solution results. At the end of coupling the disazo dyestuff is precipitated at pH 9 to 9.5 using sodium carbonate and then separated by filtration.

The compound of formula 45a results.

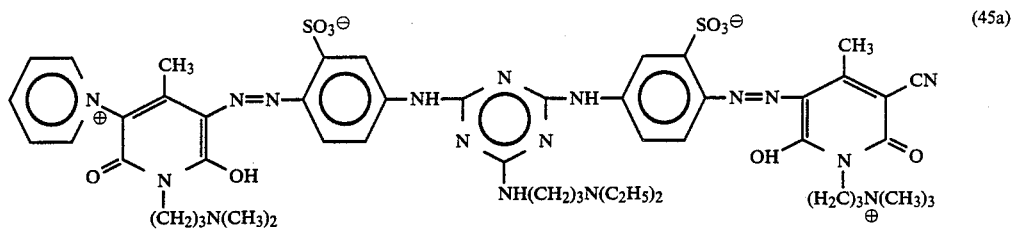
(45a)

The resulting dyestuff dissolves well in dilute carboxylic acids such as acetic acid, lactic acid and methoxyacetic acid. The dyestuff solution dyes paper a blueish-red nuance. The dyeings have very good wet-fastness properties and good light fastness properties. The waste water is practically colourless.

EXAMPLE 45

The compound of the formula

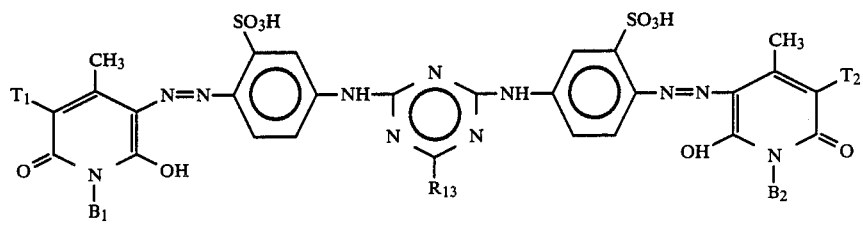

in which the symbols are defined in Table 5 below can be prepared by a method analogous to that of Example 44 from appropriate starting compounds.

TABLE 5

| Ex. No. | $R_{13}$ | $T_1$ | $T_2$ | $B_1$ | $B_2$ | shade on paper |
|---|---|---|---|---|---|---|
| 45 | —NH(CH$_2$)$_3$N(C$_2$H$_5$)$_2$ | [pyridinium-N⊕ with A⊖] | —CN | —(CH$_2$)$_3$—N(CH$_3$)$_2$ | —(CH$_2$)$_3$—N(CH$_3$)$_2$ | red |

Any A⊖ in Examples 1–45 is acetate. However, each acetate anion may be replaced by any other non-chromophoric anion, for example, those mentioned above.

In the following application examples the compounds of Examples 1 to 45 are added in acid addition salt form.

APPLICATION EXAMPLE A

70 Parts of chemically bleached sulphite cellulose obtained from pinewood and 30 parts of chemically bleached sulphite cellulose obtained from birchwood are ground in 2000 parts of water in a Hollander. 0.2 Parts of the dyestuff of Example 1 are added into this pulp. Paper is produced from this pulp after mixing for 20 minutes. The absorbent paper which is obtained in this manner is dyed a scarlet tone and the waste water is practically colourless.

APPLICATION EXAMPLE B 0.5 Parts of the dyestuff of Example 1 are dissolved in 100 parts of hot water and cooled to room temperature. The solution is added to 100 parts of chemically bleached sulphite cellulose which have been ground in a Hollander with 2000 parts of water. Sizing takes place after a thorough mixing for 15 minutes. The paper which is produced from this material has a scarlet tone of middle intensity and has good fastness properties.

APPLICATION EXAMPLE C

An absorbent web of unsized paper is drawn at a temperature of 40° to 50° through a dyestuff solution having the following composition:

0.5 parts of the dyestuff mixture of Example 1
0.5 parts of starch
99.0 parts of water.

The excess dyestuff solution is squeezed out through two rollers. The dried web of paper is dyed a scarlet tone and has good fastness properties.

APPLICATION EXAMPLE D

2 Parts of the dyestuff of Example 1 are dissolved in 4000 parts of demineralised water at 40° C. 100 Parts of a prewetted cotton textile substrate are added and the bath is raised to boiling point over 30 minutes and held at the boil for 1 hour, topping up with water where necessary. After removing the dyed web from the bath, washing and drying, a scarlet dyeing is obtained with good light fastness and wet fastness properties. The dye exhausts practically totally and the waste water is practically colourless.

APPLICATION EXAMPLE E

100 Parts of freshly tanned and neutralized chrome leather are agitated for 30 minutes in a vessel with a dyebath of 250 parts of water and 1 part of the dyestuff of Example 1 at 55° C. and are then treated in the same bath for 30 minutes with 2 parts of an anionic fatty liquor based on sulphonated train oil. The leather is then dried and prepared in the normal way, giving a leather evenly dyed in a scarlet tone.

Other low affinity vegetable tanned leathers can be similarly dyed by known methods.

APPLICATION EXAMPLE F

70 Parts of a highly bleached wood pulp and 30 parts of chemically bleached sulphite cellulose obtained from birchwood are ground in 2000 parts of water in a Hollander. 0.3 parts of the dyestuff of Example 1 are added into this pulp. After 20 minutes paper is produced from this pulp. The resulting paper is dyed scarlet and the waste water is practically colourless.

Any one of the dyestuffs of Examples 2 to 45 may be used in place of that of Example 1 in any one of Application Examples A to F.

What is claimed is:

1. A compound of the formula

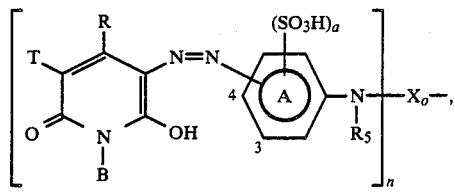

or a salt thereof, wherein
each B is independently hydrogen; $C_{1-4}$alkyl; ($C_{1-4}$alkoxy)$C_{1-4}$alkyl; $C_{2-4}$hydroxyalkyl; $C_{5-6}$cycloalkyl; $C_{5-6}$cycloalkyl substituted by 1 to 3 $C_{1-4}$alkyl groups; phenyl($C_{1-3}$alkyl); phenyl($C_{1-3}$alkyl) the phenyl group of which is substituted by 1 to 3 substituents selected from $C_{1-4}$alkyl, $C_{1-4}$alkoxy and halo; —A—NH—$R_2$; —$A_2$—N($R_7$)$_2$; —$A_1$—N$^\oplus$($R_8$)$_2$$R_9$A$^\ominus$ or —N($R_7$)$_2$, wherein A is linear or branched $C_{1-10}$alkylene, linear or branched $C_{2-10}$alkenylene, cyclohexylene or phenylene, $A_1$ is linear or branched $C_{2-8}$alkylene; linear or branched $C_{2-8}$alkylene interrupted by one —NR$_5$— radical; linear or branched $C_{2-8}$alkylene monosubstituted by hydroxy; linear or branched $C_{2-8}$alkylene interrupted by one —NR$_5$— radical and monosubstituted by hydroxy; or linear or branched $C_{2-8}$alkenylene, $A_2$ is linear or branched $C_{1-8}$alkylene; linear or branched $C_{2-8}$alkylene interrupted by one —NR$_5$— radical; linear or branched $c_{2-8}$alkylene monosubstituted by hydroxy; linear or branched $C_{2-8}$alkylene interrupted by one —NR$_5$— radical and monosubstituted by hydroxy; or linear or branched $C_{2-8}$alkenylene, and $R_2$ is

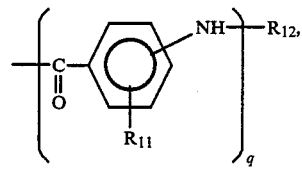

wherein
$R_{11}$ is hydrogen, halo, nitro, $C_{1-4}$alkyl or $C_{1-4}$alkoxy,
$R_{12}$ is hydrogen, —CO—(CH$_2$)$_p$—Z or

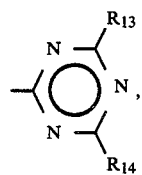

wherein
Z is —N($R_7$)$_2$ or —N$^\oplus$($R_8$)$_2$$R_9$A$^\ominus$, and
p is 1, 2 or 3, and
q is 0 or 1, with the proviso that $R_2$ is other than hydrogen when A is linear or branched $C_{1-8}$alkylene or linear or branched $C_{2-8}$alkenylene, each R is independently hydrogen; amino; $C_{1-4}$alkyl; $C_{5-6}$cycloalkyl; $C_{5-6}$cycloalkyl substituted by 1 or 2 $C_{1-4}$alkyl groups; phenyl; phenyl substituted by 1 or 2 substituents selected from methyl, ethyl, methoxy and ethoxy; benzyl; phenylethyl; or benzyl or phenylethyl the phenyl group of which is substituted by 1 or 2 substituents selected from methyl, ethyl, methoxy and ethoxy, each T is independently hydrogen, cyano, halo, —COOR$_4$, —CON(R$_5$)$_2$, —SO$_2$N(R$_5$)$_2$, —CH$_2$—NHCO—CH$_2$—N(R$_7$)$_2$, —CH$_2$—NHCO—CH$_2$—N$^\oplus$(R$_8$)$_2$R$_9$A$^\ominus$, —CH$_2$—NR$_1$R$_5$,

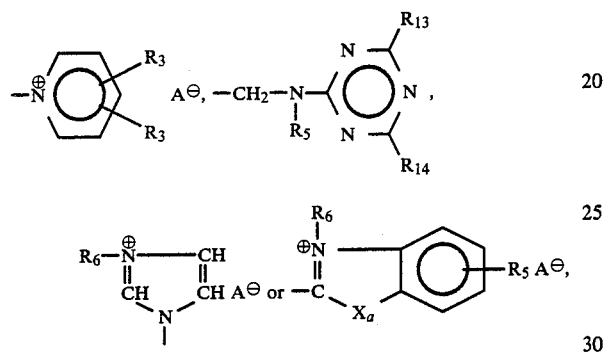

wherein $R_1$ is ($C_{1-4}$alkyl)carbonyl, $C_{1-4}$alkylsulfonyl, —CO—R$_c$—R$_d$, —SO$_2$—R$_b$ or

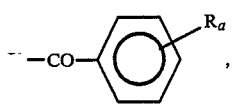

wherein $R_a$ is hydrogen, methyl, halo, methoxy, cyano or —CONH$_2$, $R_b$ is phenyl; phenyl substituted by 1 to 3 substituents selected from $C_{1-4}$alkyl, $C_{1-4}$alkoxy and halo; naphthyl or naphthyl substituted by 1 or 2 substituents selected from $C_{1-4}$alkyl, $C_{1-4}$alkoxy and halo, $R_c$ is linear or branched $C_{1-4}$alkylene, and $R_d$ is halo, cyano or methoxy, each $R_3$ is independently hydrogen, $C_{1-4}$alkyl, —N(R$_5$)$_2$ or —CON(R$_5$)$_2$, $R_4$ is $C_{1-6}$alkyl or phenyl($C_{1-3}$alkyl), $R_6$ is $C_{1-4}$alkyl, and $X_a$ is —O—, —S— or —NR$_5$—, $X_o$ is a divalent or trivalent bridging radical, each a is independently 0 or 1, with the proviso that at least 2 a's are 1, and n is 2 or 3, wherein each $R_5$ is independently hydrogen or $C_{1-4}$alkyl, each $R_7$ is independently hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or —N(R$_7$)$_2$ is pyrrolidino, piperidino, morpholino, piperazino or N-methylpiperazino, each $R_8$ is independently $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, and each $R_9$ is independently $C_{1-4}$alkyl or phenyl($C_{1-4}$alkyl), or —N$^\oplus$(R$_8$)$_2$R$_9$ is pyridinium, pyridinium substituted by 1 or 2 $C_{1-4}$alkyl groups or

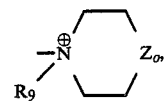

wherein $Z_o$ is a direct bond, —CH$_2$—, —O—, —S—, —NH—, —NR$_6$—, —N$^\oplus$(R$_6$)$_2$—A$^\ominus$, —SO— or —SO$_2$—, wherein each $R_6$ is independently $C_{1-4}$alkyl, and $R_9$ is $C_{1-4}$alkyl or phenyl($C_{1-4}$alkyl), each $R_{13}$ is independently halo, hydroxy, $C_{1-4}$alkoxy, $C_{1-4}$alkyl, phenyl, amino or an aliphatic, cycloaliphatic, aromatic or heterocyclic amino group the nitrogen atom of which is attached to the 1,3,5-triazine ring, each $R_{14}$ is independently an aliphatic, cycloaliphatic, aromatic or heterocyclic amino group the nitrogen atom of which is attached to the 1,3,5-triazine ring, and each A$^\ominus$ is independently a non-chromophoric anion, with the provisos that (1) the total number of basic and cationic groups is at least 3 and exceeds the number of sulfo groups, (2) each —N=N— radical attached to a Ring A is in the 3- or 4-position thereof and (3) the number of —N=N— radicals is 2 or 3.

2. A compound according to claim 1, or a salt thereof, wherein $X_o$ is —CO—, —CS—, —CO—A$_3$—CO— or

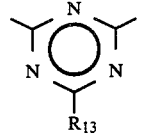

when n is 2, and is

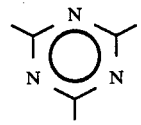

when n is 3, wherein $A_3$ is a direct bond, linear or branched $C_{1-4}$alkylene, —CH=CH—,

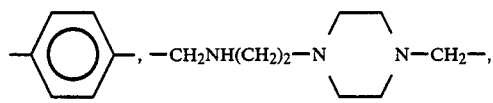

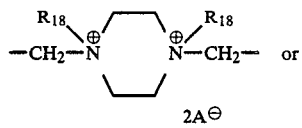

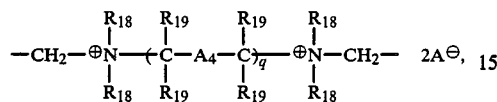

wherein
$A_4$ is a direct bond, linear or branched $C_{2-8}$alkylene, phenylene or

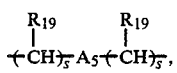

wherein
$A_5$ is —NHCONH—, —NHCO—(CH$_2$)$_s$—CONH—,

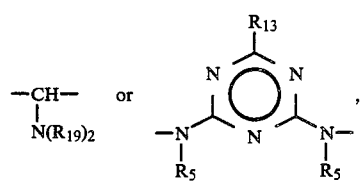

each $R_{18}$ is independently $C_{1-6}$alkyl; phenyl($C_{1-6}$alkyl); $C_{2-4}$alkyl monosubstituted by hydroxy, cyano or halo; $C_{2-6}$alkenyl or $C_{2-6}$alkenyl monosubstituted by hydroxy, cyano, halo or phenyl, and q is 0 or 1, wherein
each $R_5$ is independently hydrogen or $C_{1-4}$alkyl,
each $R_{13}$ is independently halo, hydroxy, $C_{1-4}$alkoxy, $C_{1-4}$alkyl, phenyl, amino or an aliphatic, cycloaliphatic, aromatic or heterocyclic amino group the nitrogen atom of which is attached to the 1,3,5-triazine ring,
each $R_{19}$ is independently hydrogen; $C_{1-6}$alkyl; phenyl($C_{1-6}$alkyl); $C_{2-4}$alkyl monosubstituted by hydroxy, cyano or halo; $C_{2-6}$alkenyl or $C_{2-6}$alkenyl monosubstituted by hydroxy, cyano, halo or phenyl, and
each s is independently 0, 1, 2, 3, 4, 5 or 6.

3. A compound according to claim 2, or a salt thereof, wherein
each $R_{13}$ is independently chloro, hydroxy, methoxy, amino, N,N-di-($C_{2-4}$hydroxyalkyl)amino,

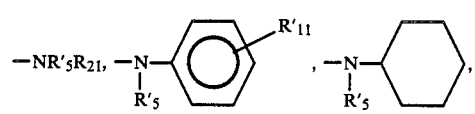

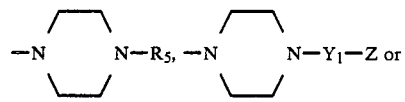

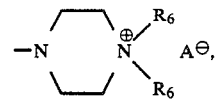

wherein
$R'_5$ is hydrogen, methyl or ethyl,
$R'_{11}$ is hydrogen, chloro, nitro, methyl or methoxy, and
$R_{21}$ is $C_{1-12}$alkyl; $C_{1-12}$alkyl substituted by hydroxy; alkyl having a maximum of 12 carbon atoms which is interrupted by 1 to 3 radicals selected from —NR$_7$— and —N$^\oplus$(R$_8$)$_2$—A$^\ominus$; alkyl having a maximum of 12 carbon atoms which is substituted by hydroxy and interrupted by 1 to 3 radicals selected from —NR$_7$— and —N$^\oplus$(R$_8$)$_2$—A$^\ominus$; —NHCO—CH$_2$—Z; —CH$_2$—CONH—Y$_1$—Z; —Y$_1$—Z;

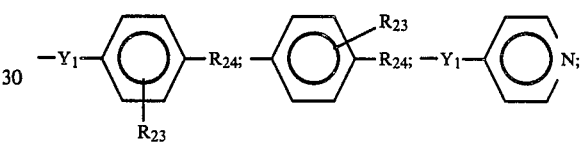

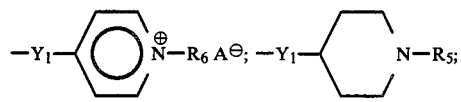

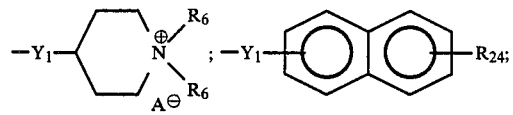

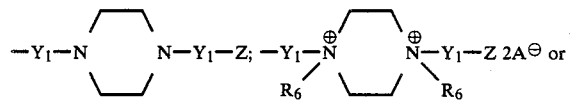

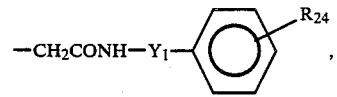

wherein
$R_{23}$ is halo, hydroxy, nitro, $C_{1-4}$alkyl or $C_{1-4}$alkoxy, and
$R_{24}$ is —N(R'$_7$)$_2$, —N$^\oplus$(R'$_8$)$_2$R'$_9$A$^\ominus$, —CO—Y$_2$—Z', —NHCO—Y$_2$—Z', —CONH—Y$_2$—Z', —SO$_2$—NH—Y$_2$—Z', —Y$_2$—Z' or —NHNHCO—CH$_2$—Z', and
each $R_{14}$ is independently —NR'$_5$R$_{21}$,

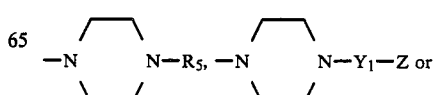

-continued

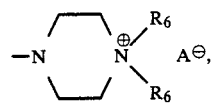

wherein
R'₅ and R₂₁ are as defined above, wherein
each R₅ is independently hydrogen or $C_{1-4}$alkyl,
each R₆ is independently $C_{1-4}$alkyl,
each Y₁ is independently linear or branched $C_{1-8}$alkylene or linear or branched $C_{3-8}$alkenylene,
each Y₂ is independently linear or branched $C_{1-8}$alkylene,
each Z is independently —N(R₇)₂ or —N⊕(R₈)₂R₉A⊖, and
each Z' is independently —N(R'₇)₂ or —N⊕(R'₈)₂R'₉A⊖, wherein
each R₇ is independently hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or
—N(R₇)₂ is pyrrolidino, piperidino, morpholino, piperazino or N-methylpiperazino,
each R'₇ is independently hydrogen, $C_{1-6}$alkyl, n-hydroxy($C_{2-3}$alkyl), benzyl or 2-cyanoethyl, or
—N(R'₇)₂ is pyrrolidino, piperidino, morpholino, piperazino or N-methylpiperazino,
each R₈ is independently $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, and
each R₉ is independently $C_{1-4}$alkyl or phenyl($C_{1-4}$alkyl), or
—N⊕(R₈)₂R₉ is pyridinium, pyridinium substituted by 1 or 2 $C_{1-4}$alkyl groups or

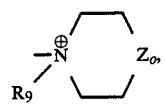

wherein
$Z_o$ is a direct bond, —CH₂—, —O—, —S—, —NH—, —NR₆—, —N⊕(R₆)₂—A⊖, —SO— or —SO₂—, wherein
each R₆ is independently $C_{1-4}$alkyl, and R₉ is $C_{1-4}$alkyl or phenyl($C_{1-4}$alkyl),
each R'₈ is independently $C_{1-6}$alkyl, n-hydroxy($C_{2-3}$alkyl), benzyl or 2-cyanoethyl, and
each R'₉ is independently methyl, ethyl, propyl or benzyl, or
—N⊕(R'₈)₂R'₉ is pyridinium, pyridinium substituted by 1 or 2methyl groups or

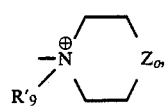

wherein
R'₉ and $Z_o$ are as defined above, and each A⊖ is independently a non-chromophoric anion.

4. A compound according to claim 3, or a salt thereof, wherein
each R₅ is independently hydrogen, methyl or ethyl,
each R₆ is independently methyl or ethyl,
each R₂₁ is independently $C_{1-12}$alkyl, $C_{2-12}$alkyl monosubstituted by hydroxy in other than the 1-position, —(CH₂)ₘ—NR'₇—(CH₂)ₘ—NR'₇R'₇ₐ, —(CH₂)ₘ—NR'₇—(CH₂)ₘ—N⊕(R'₈)₂R'₉ₐA⊖, —(CH₂)ₘ—N⊕(R'₈)₂—(CH₂)ₘ—NR'₇R'₇ₐA⊖, —(CH₂)ₘ—N⊕(R'₈)₂—(CH₂)ₘ—N⊕(R'₈)₂R'₉ₐ2A⊖, —NHCO—CH₂—Z', —CH₂—CONH—Y₁—Z', —Y₁—Z',

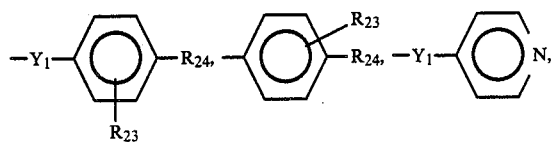

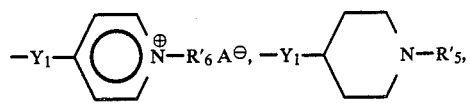

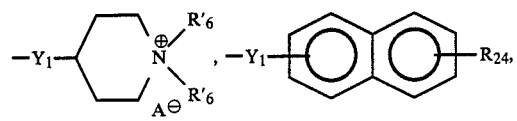

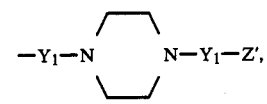

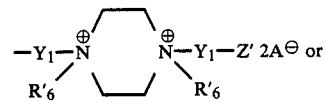

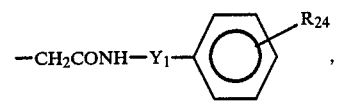

wherein
each R'₆ is independently methyl or ethyl,
R'₇ₐ is primary or secondary $C_{1-4}$alkyl, 2-hydroxyethyl, 2-hydroxypropyl or 3-hydroxypropyl,
R'₉ₐ is methyl, ethyl or propyl, and
each m is independently 2, 3 or 4, and
each Z is independently —N(R'₇)₂ or —N⊕(R'₈)₂R'₉A⊖, wherein
R'₅, R'₇, R'₈, R'₉, R₂₃, R₂₄, Y₁, Z' and A⊖ are as defined in claim 3,
with the provisos that in R₁₃ (i) the hydroxy group of any hydroxyalkyl group attached to a nitrogen atom is in other than the 1-position, (ii) no atom contains more than one substituent selected from tertiary alkyl and substituted tertiary alkyl, and (iii) any Y₁ or Y₂ linking two nitrogen atoms is linear or branched $C_{2-8}$alkylene and the two nitrogen atoms are separated by at least two carbon atoms.

5. A compound according to claim 4, or a salt thereof, wherein each R is independently methyl, ethyl, phenyl, benzyl or cyclohexyl, and each T is independently hydrogen, cyano, —CON(R'₅)₂ or

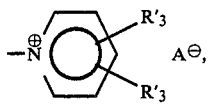

wherein each R'₃ is independently hydrogen, methyl, ethyl, amino, dimethylamino, dimethylcarbamoyl or diethylcarbamoyl, and each R'₅ is independently hydrogen, methyl or ethyl.

6. A compound according to claim 1, or a salt thereof, wherein each T is independently hydrogen, cyano, —CON(R'₅)₂ or

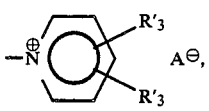

wherein each R'₃ is independently hydrogen, methyl, ethyl, amino, dimethylamino, dimethylcarbamoyl or diethylcarbamoyl, and each R'₅ is independently hydrogen, methyl or ethyl.

7. A compound according to claim 1, or a salt thereof, wherein each R is independently methyl, ethyl, phenyl, benzyl or cyclohexyl.

8. A compound according to claim 1, or a salt thereof, wherein each B is independently hydrogen, methyl, ethyl, hydroxyethyl, benzyl, cyclohexyl, —A'—N-H—R'₂, —(CH₂)$_p$—N(R'₇)₂ or —(CH₂)$_k$—N⊕(R'₈)₂R'₉A⊖, wherein A' is linear or branched C$_{2-8}$alkylene or phenylene, R'₂ is

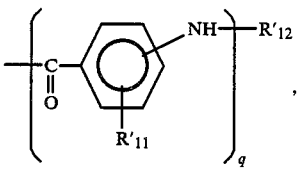

wherein

R'₁₁ is hydrogen, chloro, nitro, methyl or methoxy,

R'₁₂ is hydrogen, —CO—(CH₂)$_r$—Z' or

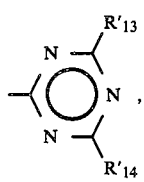

wherein t is 1 or 2, and q is 0 or 1, with the proviso that R'₂ is other than hydrogen when A' is —(CH₂)$_p$—, k is 2 or 3, and p is 1, 2 or 3, wherein each R'₁₃ is independently chloro, hydroxy, methoxy, amino, N,N-di-(C$_{2-4}$hydroxyalkyl)amino,

—NR'₅R₂₁,

[structures shown]

wherein

R'₅ is hydrogen, methyl or ethyl,

R'₁₁ is hydrogen, chloro, nitro, methyl or methoxy, and

R₂₁ is C$_{1-12}$alkyl; C$_{1-12}$alkyl substituted by hydroxy; alkyl having a maximum of 12 carbon atoms which is interrupted by 1 to 3 radicals selected from —NR₇— and —N⊕(R₈)₂—A⊖; alkyl having a maximum of 12 carbon atoms which is substituted by hydroxy and interrupted by 1 to 3 radicals selected from —NR₇— and —N⊕(R₈)₂—A⊖; —NHCO—CH₂—Z; —CH₂—CONH—Y₁—Z; —Y₁—Z;

[structures shown]

wherein $R_{23}$ is halo, hydroxy, nitro, $C_{1-4}$alkyl or $C_{1-4}$alkoxy, and $R_{24}$ is —$N(R'_7)_2$, —$N^{\oplus}(R'_8)_2R'_9A^{\ominus}$, —CO—$Y_2$—$Z'$, —NHCO—$Y_2$—$Z'$, —CONH—$Y_2$—$Z'$, —$SO_2NH$—$Y_2$—$Z'$, —$Y_2$—$Z'$ or —NHNHCO—$CH_2$—$Z'$, and each $R'_{14}$ is independently —$NR'_5R_{21}$,

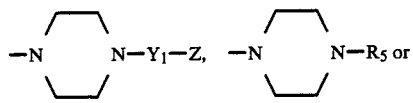

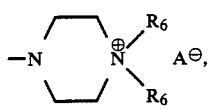

wherein
$R'_5$ and $R_{21}$ are as defined above, wherein
each $R_5$ is independently hydrogen or $C_{1-4}$alkyl,
each $R_6$ is independently $C_{1-4}$alkyl,
each $Y_1$ is independently linear or branched $C_{1-8}$alkylene or linear or branched $C_{3-8}$alkenylene,
each $Y_2$ is independently linear or branched $C_{1-8}$alkylene,
each Z is independently —$N(R_7)_2$ or —$N^{\oplus}(R_8)_2R_9A^{\ominus}$, and
each $Z'$ is independently —$N(R'_7)_2$ or —$N^{\oplus}(R'_8)_2R'_9A^{\ominus}$, wherein
each $R_7$ is independently hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or
—$N(R_7)_2$ is pyrrolidino, piperidino, morpholino, piperazino or N-methylpiperazino,
each $R'_7$ is independently hydrogen, $C_{1-6}$alkyl, n-hydroxy($C_{2-3}$alkyl), benzyl or 2-cyanoethyl, or
—$N(R'_7)_2$ is pyrrolidino, piperidino, morpholino, piperazino or N-methylpiperazino,
each $R_8$ is independently $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, and
each $R_9$ is independently $C_{1-4}$alkyl or phenyl($C_{1-4}$alkyl), or
—$N^{\oplus}(R_8)_2R_9$ is pyridinium, pyridinium substituted by 1 or 2 $C_{1-4}$alkyl groups or

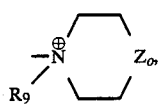

wherein
$Z_o$ is a direct bond, —$CH_2$—, —O—, —S—, —NH—, —$NR_6$—, —$N^{\oplus}(R_6)_2$—$A^{\ominus}$, —SO— or —$SO_2$—,
wherein each $R_6$ is independently $C_{1-4}$alkyl, and $R_9$ is $C_{1-4}$alkyl or phenyl($C_{1-4}$alkyl), each $R'_8$ is independently $C_{1-6}$alkyl, n-hydroxy($C_{2-3}$alkyl), benzyl or 2-cyanoethyl, and
each $R'_9$ is independently methyl, ethyl, propyl or benzyl, or
—$N^{\oplus}(R'_8)_2R'_9$ is pyridinium, pyridinium substituted by 1 or 2 methyl groups or

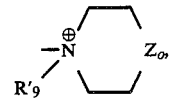

wherein $R'_9$ and $Z_o$ are as defined above, and each $A^{\ominus}$ is independently a non-chromophoric anion.

9. A compound according to claim 8 having the formula

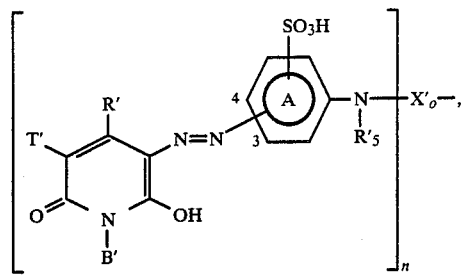

or a salt thereof, wherein
each $B'$ is independently hydrogen, methyl, ethyl, hydroxyethyl, benzyl, cyclohexyl, —$A'$—N—H—$R'_2$, —$(CH_2)_p$—$N(R'_7)_2$ or —$(CH_2)_k$—$N^{\oplus}(R'_8)_2R'_9A^{\ominus}$, wherein
$A'$, $R'_2$, $R'_7$, $R'_8$, $R'_9$, k, p and $A^{\ominus}$ are as defined in claim 8,
each $R'$ is independently methyl, ethyl, phenyl, benzyl or cyclohexyl,
each $R'_5$ is independently hydrogen, methyl or ethyl,
each $T'$ is independently hydrogen, cyano, —$CON(R'_5)_2$ or

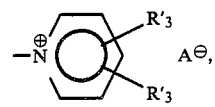

wherein
each $R'_3$ is independently hydrogen, methyl, ethyl, amino, dimethylamino, dimethylcarbamoyl or diethylcarbamoyl, and
each $R'_5$ is independently hydrogen, methyl or ethyl,
$X'_o$ is —CO—, —CS—, —CO—$A_3$—CO— or

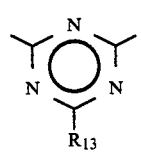

when n is 2, and is

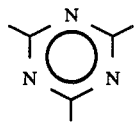

when n is 3,
wherein
A$_3$ is a direct bond, linear or branched C$_{1-4}$alkylene, —CH=CH—,

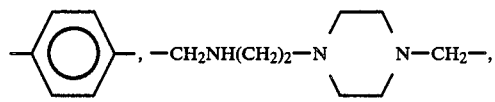

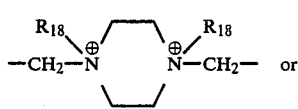

wherein
A$_4$ is a direct bond, linear or branched C$_{2-8}$alkylene, phenylene or

wherein
A$_5$ is —NHCONH—, —NHCO—(CH$_2$)$_2$—)$_s$—CONH—,

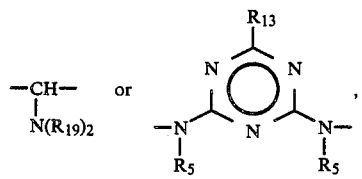

each R$_{18}$ is independently C$_{1-6}$alkyl; phenyl(C$_{1-6}$alkyl); C$_{2-4}$alkyl monosubstituted by hydroxy, cyano or halo; C$_{2-6}$alkenyl or C$_{2-6}$alkenyl monosubstituted by hydroxy, cyano, halo or phenyl, and
q is 0 or 1, and
n is 2 or 3, wherein
each R$_5$ is independently hydrogen or C$_{1-4}$alkyl,
each R$_{13}$ is independently halo, hydroxy, C$_{1-4}$alkoxy, C$_{1-4}$alkyl, phenyl, amino or an aliphatic, cycloaliphatic, aromatic or heterocyclic amino group the nitrogen atom of which is attached to the 1,3,5-triazine ring,
each R$_{19}$ is independently hydrogen; C$_{1-6}$alkyl; phenyl(C$_{1-6}$alkyl); C$_{2-4}$alkyl monosubstituted by hydroxy, cyano or halo; C$_{2-6}$alkenyl or C$_{2-6}$alkenyl monosubstituted by hydroxy, cyano, halo or phenyl, and
each s is independently 0, 1, 2, 3, 4, 5 or 6, with the provisos that (1) the total number of basic and cationic groups is at least 3 and exceeds the number of sulfo groups, (2) each —N=N— radical attached to a Ring A is in the 3- or 4-position thereof, and (3) the number of —N=N— radicals is 2 or 3.

10. A compound according to claim 9, or a salt thereof, wherein
X$'_o$ is

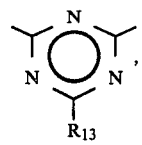

and
n is 2.

11. A compound according to claim 8 having the formula

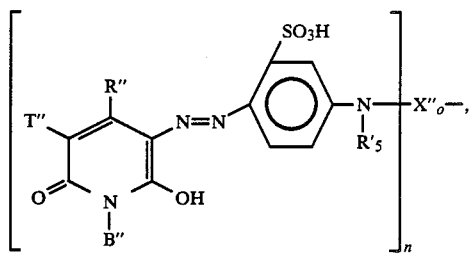

or a salt thereof, wherein
each B" is independently hydrogen, methyl, ethyl, benzyl, —A"—NH—R"$_2$, —(CH$_2$)$_k$—N(R"$_7$)$_2$ or —(CH$_2$)$_k$—N$^\oplus$(R"$_8$)$_2$R"$_9$A$^\ominus$, wherein
A" is 1,2-ethylene, 1,3-propylene, 1,3-phenylene or 1,4-phenylene,
R"$_2$ is

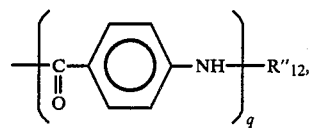

wherein
R"$_{12}$ is hydrogen, —CO—CH$_2$—Z" or

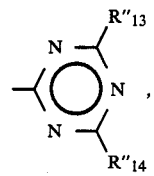

wherein
each of R"$_{13}$ and R"$_{14}$ is independently —NR"$_5$R'$_{21}$,

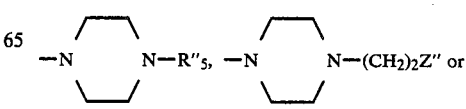

-continued

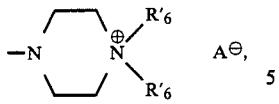

and
q is 0 or 1,
with the proviso that $R''_2$ is other than hydrogen when $A''$ is 1,2-ethylene or 1,3-propylene,
 each $R''$ is independently methyl or phenyl,
 each $R'_5$ is independently hydrogen, methyl or ethyl,
 each $T''$ is independently hydrogen, cyano or

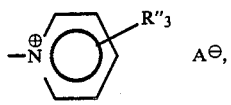

wherein
$R''_3$ is hydrogen or methyl,
$X''_o$ is

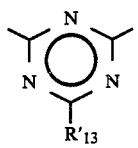

when n is 2, and is

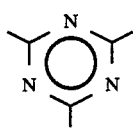

when n is 3, and
n is 2 or 3, wherein
each $R''_5$ is independently hydrogen or methyl,
each $R'_6$ is independently methyl or ethyl, and
each $R'_{21}$ is independently —(CH$_2$)$_k$—NR''$_7$—(CH$_2$)$_k$—NR''$_7$—C$_2$H$_5$, —(CH$_2$)$_k$—N$^\oplus$(R''$_8$)$_2$—(CH$_2$)$_k$—N$^\oplus$(R''$_8$)$_2$—C$_2$H$_5$2A$^\ominus$, —(CH$_2$)$_k$—NR'$_7$—C$_2$H$_5$, —(CH$_2$)$_k$—N$^\oplus$(R''$_8$)$_2$—C$_2$H$_5$A$^\ominus$, —NHCO—CH$_2$—Z'', —CH$_2$—CONH—Y'$_2$—Z'',

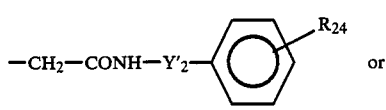 or

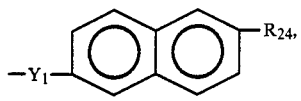

wherein
$Y'_2$ is linear or branched C$_{1-4}$alkylene, wherein
each $Z''$ is independently —N(R''$_7$)$_2$ or —N$^\oplus$(R''$_8$)$_2$-R''$_9$A$^\ominus$, and
each k is independently 2 or 3, wherein
each R''$_7$ is independently hydrogen, methyl, ethyl or 2-hydroxyethyl, or
—N(R''$_7$)$_2$ is morpholino, piperidino, piperazino or N-methylpiperazino,
each R''$_8$ is independently methyl, ethyl or 2-hydroxyethyl, and
R''$_9$ is methyl, ethyl or benzyl, or
—N$^\oplus$(R''$_8$)$_2$R''$_9$ is pyridinium, pyridinium substituted by 1 or 2 methyl groups or

wherein
R''$_9$ is methyl, ethyl or benzyl,
wherein $R'_{13}$, $R_{24}$, $Y_1$, $Z_o$ and $A^\ominus$ are as defined in claim 8, with the proviso that the total number of basic and cationic groups is at least 3 and exceeds the number of sulfo groups.

12. A compound according to claim 11, or a salt thereof, wherein n is 2.

13. The salt according to claim 12 wherein
each $B''$ is —(CH$_2$)$_3$—N(CH$_3$)$_2$,
each $R''$ is methyl,
each $R'_5$ is hydrogen,
$R'_{13}$ is —NH—(CH$_2$)$_3$—N(C$_2$H$_5$)$_2$, and
each $T''$ is pyridinium acetate.

14. The salt according to claim 12 wherein
each $B''$ is —(CH$_2$)$_3$—N(CH$_3$)$_2$,
each $R''$ is methyl,
each $R'_5$ is hydrogen,
$R'_{13}$ is

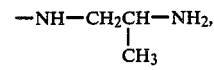

and
each $T''$ is pyridinium acetate.

15. The salt according to claim 12 having the formula

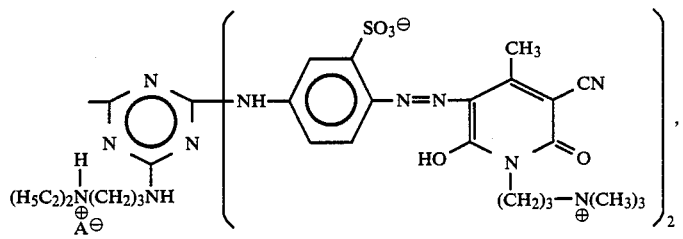

wherein $A^\ominus$ is acetate.

16. The salt according to claim 12 having the formula

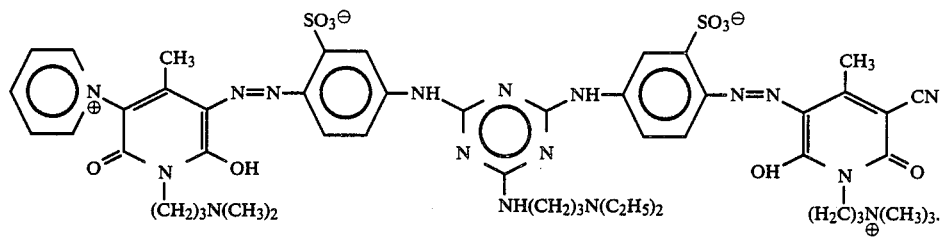

17. A compound according to claim 9, or a salt thereof, wherein
$X'_0$ is

when n is 2, and is

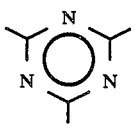

when n is 3,
wherein
$R'_{13a}$ is chloro, hydroxy, methoxy, amino, N,N-di-(C$_{2-4}$hydroxyalkyl)amino, —NR$'_5$R$_{21a}$,

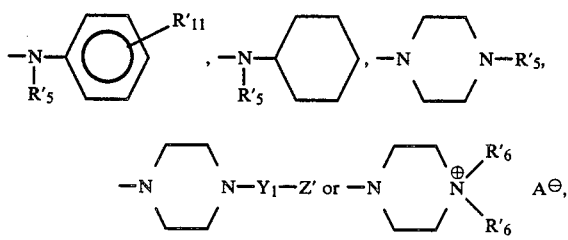

wherein
$R'_{11}$ is hydrogen, chloro, nitro, methyl or methoxy, and
$R_{21a}$ is C$_{1-12}$alkyl, C$_{2-12}$alkyl monosubstituted by hydroxy in other than the 1-position, —(CH$_2$)$_m$—NR$'_7$—(CH$_2$)$_m$—NR$'_7$R$'_{7a}$, —(CH$_2$)$_m$—NR$'_7$—(CH$_2$)$_m$—N$^\oplus$(R$'_8$)$_2$R$'_{9a}$A$^\ominus$, —(CH$_2$)$_m$—N$^\oplus$(R$'_8$)$_2$—(CH$_2$)$_m$—NR$'_7$R$'_{7a}$A$^\ominus$, —(CH$_2$)$_m$—N$^\oplus$(R$'_8$)$_2$—(CH$_2$)$_m$—N$^\oplus$(R$'_8$)$_2$R$'_{9a}$2A$^\ominus$, —NHCO—CH$_2$—Z', —CH$_2$—CONH—Y$_1$—Z', —Y$_1$—Z',

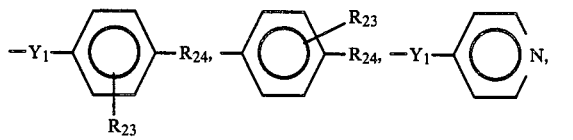

wherein
$R'_5$ is hydrogen, methyl or ethyl,
each $R'_6$ is independently methyl or ethyl,
$R_{23}$ is halo, hydroxy, nitro, C$_{1-4}$alkyl or C$_{1-4}$alkoxy,
$R_{24}$ is —N(R$'_7$)$_2$, —N$^\oplus$(R$'_8$)$_2$R$'_9$A$^\ominus$, —CO—Y$_2$—Z', —NHCO—Y$_2$—Z', —CONH—Y$_2$—Z', —SO$_2$NH—Y$_2$—Z', —Y$_2$—Z' or —NHNHCO—CH$_2$—Z', wherein Z' is as defined below,
Z' is —N(R$'_7$)$_2$ or —N$^\oplus$(R$'_8$)$_2$R$'_9$A$^\ominus$, and
each m is independently 2, 3 or 4, wherein
each R$'_7$ is independently hydrogen, C$_{1-6}$alkyl, n-hydroxy(C$_{2-3}$alkyl), benzyl or 2-cyanoethyl, or
—N(R$'_7$)$_2$ is pyrrolidino, piperidino, morpholino, piperazino or N-methylpiperazino,
R$'_{7a}$ is primary or secondary C$_{1-4}$alkyl, 2-hydroxyethyl, 2-hydroxypropyl or 3-hydroxypropyl,
each R$'_8$ is independently C$_{1-6}$alkyl, n-hydroxy(C$_{2-3}$alkyl), benzyl or 2-cyanoethyl, and
R$'_9$ is methyl, ethyl, propyl or benzyl, or
—N$^\oplus$(R$'_8$)$_2$R$'_9$ is pyridinium, pyridinium substituted by 1 or 2 C$_{1-4}$alkyl groups or

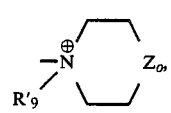

wherein $Z_o$ is a direct bond, —CH$_2$—, —O—, —S—, —NH—, —NR$_6$—, —N$^\oplus$(R$_6$)$_2$—A$^\ominus$, —SO— or —SO$_2$—, wherein each $R_6$ is independently $C_{1-4}$alkyl, and $R'_9$ is as defined above, $R'_{9a}$ is methyl, ethyl or propyl, each $Y_1$ is independently linear or branched $C_{1-8}$alkylene or linear or branched $C_{3-8}$alkenylene, and each $Y_2$ is linear or branched $C_{1-8}$alkylene, wherein each A$^\ominus$ is independently a non-chromophoric anion, with the provisos that in $R'_{13a}$ (i) the hydroxy group of any hydroxyalkyl group attached to a nitrogen atom is in other than the 1-position, (ii) no atom contains more than one substituent selected from tertiary alkyl and substituted tertiary alkyl, and (iii) any $Y_1$ or $Y_2$ linking two nitrogen atoms is linear or branched $C_{2-8}$alkylene and the two nitrogen atoms are separated by at least two carbon atoms.

* * * * *